3,159,658
ORGANO-METALLIC COMPOUNDS AND
PROCESS THEREFOR
Ernst Otto Fischer, Munich-Solln, and Helmut Werner, Munich, Germany, assignors to Union Carbide Corporation, a corporation of New York
No Drawing. Filed May 18, 1961, Ser. No. 128,608
Claims priority, application Germany, May 19, 1960, F 31,266
7 Claims. (Cl. 260—429)

This invention relates to novel compositions of matter and to a process of preparing the same. More particularly, this invention relates to novel organo-metallic compounds of palladium and platinum.

The compounds of this invention can be conveniently represented by the formula:

(A)             (RMX)$_2$ wherein R represents a cyclic-enyl and more particularly a cyclic 1,3 enyl, M represents platinum or palladium, and X represents a halogen selected from the group consisting of chlorine, bromine and iodine. The R groups include cyclopentenyl, cyclohexenyl, or cycloheptenyl and the lower alkyl-substituted derivatives thereof. Preferably the R group contains from five to eleven carbon atoms. The lower-alkyl derivatives include methyl, ethyl, propyl and butyl. However, it is to be understood that other monovalent substituents can also be present on the cyclic-enyl structure. For convenience only, the compounds represented by the formula (RMX)$_2$ will be hereinafter referred to as Formula A compounds.

The novel compounds of this invention are particularly useful as catalysts in organic synthesis and are also useful as plating agents for depositing platinum and palladium on platable substrates. Therefore, the preparation of metal mirrors is facilitated. These compounds can also be sublimed and dissolved in many solvents.

The novel compounds of this invention can be prepared by reacting halogeno carbonyls of palladium or platinum with cyclic 1,3 dienes. This reaction is preferably carried out at a temperature above room, but at any rate, below the temperature of decomposition (usually about 100° C.) of the novel compounds. The reaction should also be carried out in an organic solvent, particularly those having polar characteristics, as for example, tetahydrofuran, acetone, chloroform, diethyl ether and benzene, and in an inert atmosphere. It is to be observed that when a solvent is employed in the process indicated above, the reaction should preferably be carried out at the reflux temperature of the solvent-diene mixture. However, at any rate, this temperature will be below the decomposition temperature of the products obtained.

Typical metal halogeno carbonyl compounds suitable for use in providing the novel compounds of this invention include palladium carbonyl chloride, platinum carbonyl chloride, platinum carbonyl bromide and platinum carbonyl iodide.

Typical cyclic dienes suitable for use in providing the novel compounds of this invention include cyclopentadiene and the lower alkyl substituted derivatives thereof, cyclohexadiene and the lower alkyl substituted derivatives thereof, and cycloheptadiene and the lower alkyl substituted derivatives thereof.

In the procedure described above for the reaction of the aforementioned starting materials, a variety of novel organo-metallic compounds with which this invention is concerned are readily prepared and include:

($C_5H_7PdCl$)$_2$      ($C_5H_7PtCl$)$_2$
($C_5H_7PdBr$)$_2$      ($C_5H_7PtBr$)$_2$
($C_5H_7PdI$)$_2$       ($C_5H_7PtI$)$_2$
($C_6H_9PdCl$)$_2$      ($C_6H_9PtCl$)$_2$
($C_6H_9PdBr$)$_2$      ($C_6H_9PtBr$)$_2$
($C_6H_9PdI$)$_2$       ($C_6H_9PtI$)$_2$
($C_7H_{11}PdCl$)$_2$    ($C_7H_{11}PtCl$)$_2$
($C_7H_{11}PdBr$)$_2$    ($C_7H_{11}PtBr$)$_2$
($C_7H_{11}PdI$)$_2$     ($C_7H_{11}PtI$)$_2$

The dimeric compounds represented by Formula A also react with salt-like metal compounds of cyclopentadiene or indene or the lower-alkyl substituted derivatives thereof to yield novel organo-metallic complexes. These complexes can be conveniiently represented by the formula:

(RMR′)

wherein R represents a cyclic-enyl such as cyclopentenyl, cyclohexenyl, or cycloheptenyl or the lower-alkyl substituted derivatives thereof discussed above with respect to the compounds of Formula A, M represents platinum or palladium, and R′ represents a cyclopentadinyl or indenyl group or the lower-alkyl substituted derivatives thereof. Preferably, the R and R′ groups each contain five to about eleven carbon atoms. Both the R and R′ moieties are bonded to the metal atom through the formation of coordinate bonds between the ring portions of the R and R′ moieties and the metal atoms.

Illustrative of the salt compounds useful for reaction with the compounds illustrated by Formula A are the potassium, sodium, lithium or calcium compounds of the aforesaid cyclopentadienes or indenes.

Examples of the compounds represented by Formula RMR′ are cyclopentenyl-palladium-cyclopentadienyl, cyclohexenyl-palladium-cyclopentadienyl methylcyclo-heptenyl-palladium-cyclopentadienyl, cyclohexenyl-platinum-cyclopentadienyl, pentamethylcyclopentenyl-platinum-cyclopentadienyl, methylisopropylpentenyl-platinum indenyl and the like.

The compounds represented by the Formula RMR′ can in general be sublimed and dissolved in practically all organic solvents in particular in aliphatic and aromatic hydrocarbons, alcohols, ketones, ethers, chlorinated hydrocarbons, carbon disulfide, nitriles, and the like. In many cases they are sensitive to air and can be decomposed at elevated temperatures. The compounds of this invention are diamagnetic and have a relatively small but measurable dipole moment.

This process for the formation of the novel RMR′ compounds can be illustrated by the following representative equation.

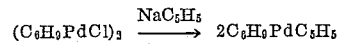

The reaction is generally carried out by contacting the reactants in an organic solvent. Suitable solvents are aliphatic hydrocarbon solvents such as petroleum ether, hexanes and heptanes, aromatic hydrocarbon solvents such as benzene, toluene and xylene, and ether solvents such as diethyl ether, tetrahydrofuran and ethylene glycol dimethyl ether. The process is preferably carried out by heating the reactants at relatively low temperatures, the reaction temperature ranging from room to slightly elevated temperatures, e.g., of the order of 35 or 40° C. In general, the reactants are contacted under an inert atmosphere, such as nitrogen gas for instance, and at ordinary (atmospheric) pressure. In some instances, the application of an increased pressure is advisable, for example where the atmospheric pressure boiling point of the reaction mixture is relatively low and a higher reaction temperature is desired in order to increase the rate of reaction. In general stoichiometric or slightly above stoichiometric amounts of reactants are employed.

The unusual structure of the compounds of this invention has been confirmed by nuclear magnetic resonance techniques. The nuclear magnetic resonance measurements were carried out according to conventional procedures at an operating frequency of 40 megacycles on benzene solutions of the compounds represented by the formula RMR'.

The nuclear magnetic resonance measurements described above and the confirmation of the structure of the $(RMX)_2$ and RMR' compounds of this invention are discussed in more detail in our papers published respectively in Chemische Berichte, 93, pp. 3011 (1960), and in Tetrahedron Letters, No. 1, pp. 17–20, 1961.

The compounds of the present invention represented by the formula RMR' are also particularly useful as catalysts in organic synthesis. Moreover, these compounds are also useful as plating agents for depositing a platinum or palladium coating on platable substrates. When a compound of formula RMR' (and also of Formula A) and a platable substrate are contacted at a temperature above the decomposition temperature of the compounds, an adherent film of metal is deposited on the substrate.

The following examples are illustrative of the present invention:

EXAMPLE 1

Preparation of $(C_6H_9PdCl)_2$

In a 250 ml. three neck flask, equipped with an agitator, a reflux condenser, a mercury valve and a dropping funnel, which was made free of air by repeated evacuations and by the introduction of nitrogen, 1 g. $Pd(CO)Cl_2$ (prepared according to W. Manchot and J. Konig, Chem. Ber. 59, 883 (1926)) and 50 ml. of dry tetrahydrofurane were placed. A mixture of 4 g. (1,3)-cyclohexadiene and 50 ml. tetrahydrofurane was quickly added. Carbon monoxide was evolved rapidly and the reaction mixture changed to a brownish-red colour. The reaction mixture was then refluxed under stirring until the solution becomes orange-yellow and a dark precipitate appears. The cold mixture was filtered and the filtrate concentrated in vacuo at 5° C. Yellow crystals were formed and were filtered off with diethylether. For recrystallization, these crystals were dissolved in 5 ml. of chloroform, treated with activated charcoal and after filtration a layer of diethylether was added. After standing in the dark for a period of 20 hours, the crystals obtained were filtered off, washed with diethylether and dried in vacuo. The yield was 0.7 g. of pure recrystallized product. The crystals decompose at about 95 to 105° C.

*Analysis.*—Calc. C, 32.34%; H, 4.07%; Pd, 47.67%; Cl, 15.91%. Found C, 32.46%; H, 3.94%; Pd, 48.20%; Cl, 15.80%.

*Molecular weight.*—Calc. 446.5. Found 424.

EXAMPLE 2

Preparation of $(C_7H_{11}PdCl)_2$

In the same apparatus as described in Example 1 a solution of 1.9 g. (1,3)-cycloheptadiene in 50 ml. tetrahydrofurane was added to 1 g. $Pd(CO)Cl_2$ and 50 ml. of dry tetrahydrofurane under stirring. The reaction mixture was stirred under reflux until the solution became orange-yellow and a dark precipitate formed. The filtered solution was thereupon concentrated in vacuo and the precipitated orange-yellow crystals were filtered off, washed with diethylether and recrystallized from chloroform as described in Example 1. After 24 hours standing in the dark at 0° C., 0.6 g. of a pure compound was filtered off, washed with diethylether and dried in vacuo. The compound decomposes at about 120–130° C.

The preparation of $(C_7H_{11}PdCl)_2$ can also be achieved in chloroform solution and the reaction mixture can be worked up by chromatography on $Al_2O_3$ (neutral).

*Analysis.*—Calc. C, 35.42%; H, 4.68%; Pd, 44.96%; Cl, 14.94%. Found C, 35.31%; H, 3.93%; Pd, 44.52%; Cl, 15.12%.

*Molecular weight.*—Calc. 474.6. Found 430.

EXAMPLE 3

Preparation of $PdC_{11}H_{14}$

To 0.45 g. of $(C_6H_9PdCl)_2$, prepared according to Example 1 and dissolved in 30 ml. of dry benzene, 0.22 g. of cyclopentadienyl potassium was added in a nitrogen atmosphere. The colour of the reaction mixture turned rapidly to brownish-red. The reaction was completed by stirring half an hour at room temperature. The precipitate of KCl was filtered off and the solution brought to dryness at 10° C. in vacuo. From the dark brown residue 0.305 g. of red crystals of M.P. 69° C. were obtained by sublimation in vacuo at 35 to 40° C. Infrared spectra identified the product as $PdC_{11}H_{14}$.

*Analysis.*—Calc. C, 52.23%; H, 5.58%; Pd, 42.19%. Found C, 52.26%; H, 5.58%; Pd, 42.07%.

*Molecular weight.*—Calc. 252.9. Found 245.6.

In like manner, according to the procedures of Examples 1 and 3, corresponding platinum compounds can also be prepared.

What is claimed is:

1. Organo-metallic compounds having the formula:

$(RMX)_2$ wherein R is a cyclic 1,3 enyl selected from the group consisting of cyclopentenyl, cyclohexenyl and cycloheptenyl; M is a member selected from the group consisting of platinum and palladium; and X is a halogen selected from the group consisting of chlorine, bromine and iodine.

2. 1,3 cyclohexenyl-palladium-chloride dimer.

3. 1,3 cycloheptenyl-palladium-chloride-dimer.

4. A process for the preparation of the compounds defined in claim 1, which comprises reacting a cyclic 1,3 diene selected from the group consisting of cyclopentadiene, cyclohexadiene and cycloheptadiene with a halogeno carbonyl of a metal selected from the group consisting of palladium and platinum.

5. Organo-metallic compounds having the formula:

RMR' wherein R is a member selected from the group consisting of cyclopentenyl, cyclohexenyl and cycloheptenyl groups; M is a member selected from the group consisting of platinum and palladium, and R' is a member selected from the group consisting of cyclopentadienyl and indenyl groups.

6. Cyclohexenyl-palladium-cyclopentadienyl.

7. A process for the preparation of the compounds defined in claim 5, which comprises reacting a compound having the formula:

$(RMX)_2$ wherein R is a cyclic 1,3 enyl selected from the group consisting of cyclopentenyl, cyclohexenyl and cycloheptenyl; M is a member selected from the group consisting of platinum and palladium; and X is a halogen selected from the group consisting of chlorine, bromine and iodine, with a compound selected from the group consisting of the potassium, sodium, lithium and calcium salts of cyclopentadiene and indene.

References Cited in the file of this patent

FOREIGN PATENTS 1,214,952 France ---------------- Nov. 16, 1959

OTHER REFERENCES

Smidt et al.; Angewandte Chemie, 71, 651 (Oct. 21, 1959).

Alexander et al.; Journal of the American Chemical Society, 82, 535–538 (Feb. 5, 1960).